Figure 4:
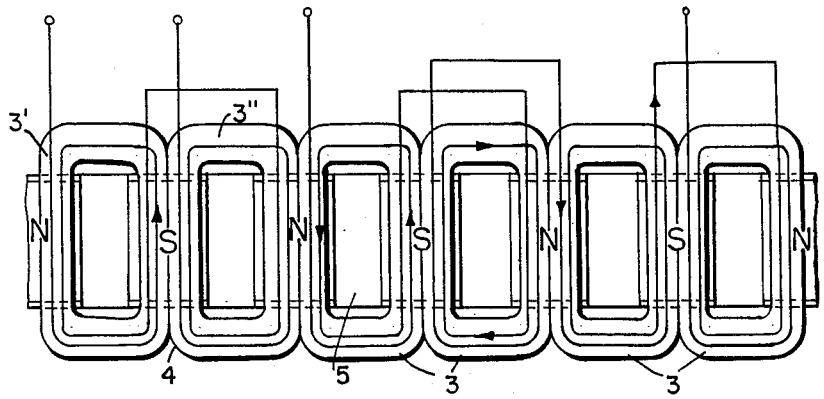

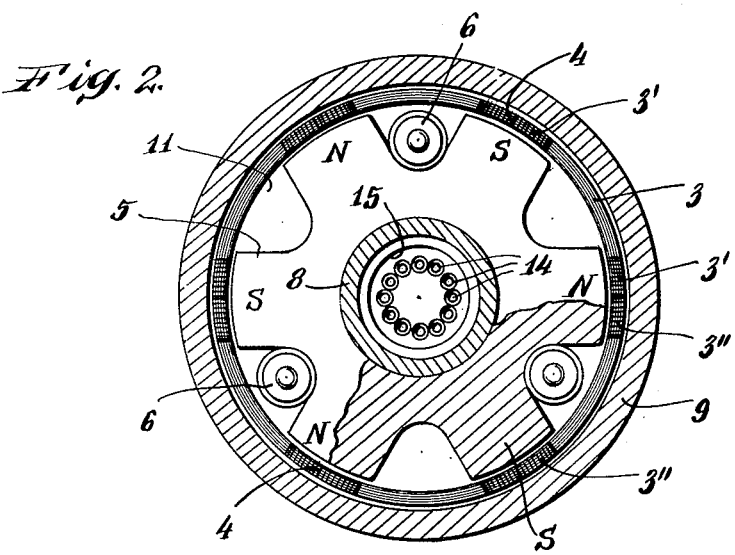
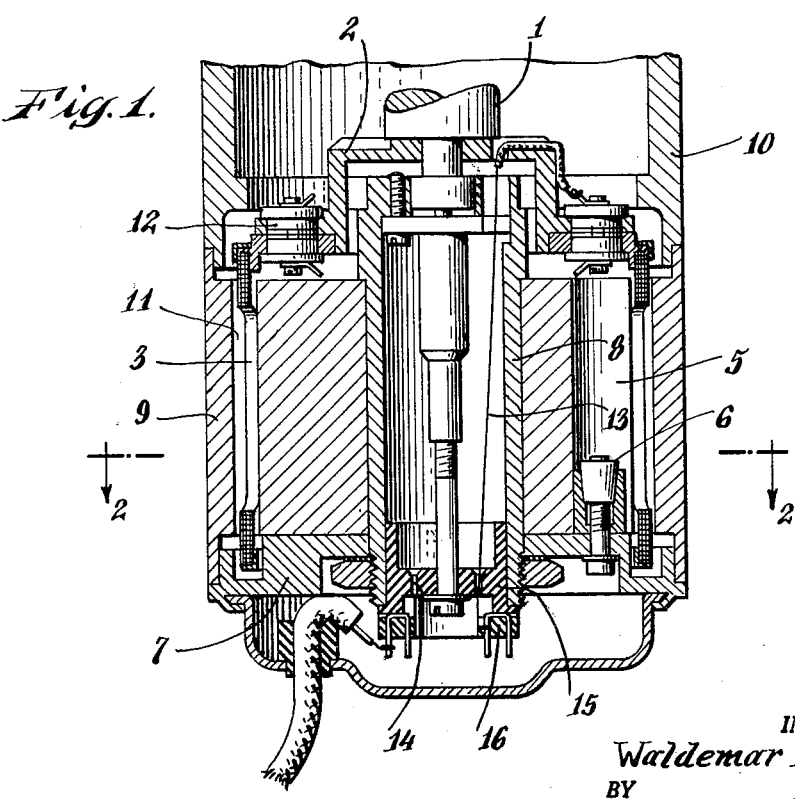

Aug. 4, 1964   W. MÖLLER   3,142,993
PICKOFF SYSTEM FOR GYROSCOPE CONTROL
Filed July 13, 1959   2 Sheets-Sheet 2

INVENTOR.
WALDEMAR MÖLLER
BY
ATTORNEY

United States Patent Office 3,142,993
Patented Aug. 4, 1964

3,142,993
PICKOFF SYSTEM FOR GYROSCOPE CONTROL
Waldemar Möller, 10 Weinbergstrasse,
Überlingen (Bodensee), Germany
Filed July 13, 1959, Ser. No. 826,719
Claims priority, application Germany July 11, 1958
4 Claims. (Cl. 74—5.6)

This invention is concerned with a gyroscope for control purposes in which a voltage can be controlled as a function of the precession of the gyro by means of an electric pickoff system.

In control applications, it is often necessary to form differentials or integrals of measuring voltages by electrical means. Potentiometers are not well suited for such purposes even if very finely stepped resistances are provided. Even with such resistances, only a stepwise variation of the control voltage is obtainable. Inductive pickoff systems modulating alternating voltages are likewise unsuitable for control gyros of the type referred to above.

The invention is based upon the knowledge that a satisfactory control value can be obtained from the gyro by means of a dynamic-inductive pickoff. With a pickoff system of this type, the precession movement induces a control voltage in a coil which is arranged in a magnetic field.

In order to provide such a dynamic-inductive pickoff system with control gyros, it is contemplated in accordance with the present invention that a cylindrical coil body be coaxially connected with the precession axis of the gyro. The cylindrical coil body is formed of adjacent single coils and is positioned in the air gap formed between a star shaped magnetic core, which has alternate north and south magnetic poles, and a ring shaped magnetic shunt.

Advantageously the single coils of the cylindrical coil body extend from center to center of two neighboring magnetic poles.

If the gyro performs a precession movement, the coil body is rotated relative to the star shaped magnetic core. A voltage proportional to the speed of revolution is induced in each of the single coils. The induced voltage is available for control purposes either directly or, if necessary, after electric integration.

A special advantage of the arrangement according to the invention results from the fact that some of the single coils may be connected to form a dynamic-inductive pickoff for the purpose of measuring the speed of revolution of the precession shaft of the gyro, while others act as a polyphase alternating current transmitter which can be fed with a control voltage. Owing to the pickoff system being arranged symmetrical with respect to the precession axis, the voltage can be picked off with practically no feedback. Advantageously, the lead-in wires are passed through a central, axially extending channel of the magnetic core and fixed at one end on a coil support which is rotatable together with the precession axis and, at the other end, on the stationary magnetic core. It is possible in this way to avoid the otherwise common spiral shaped lead-in wires.

Figure 3:
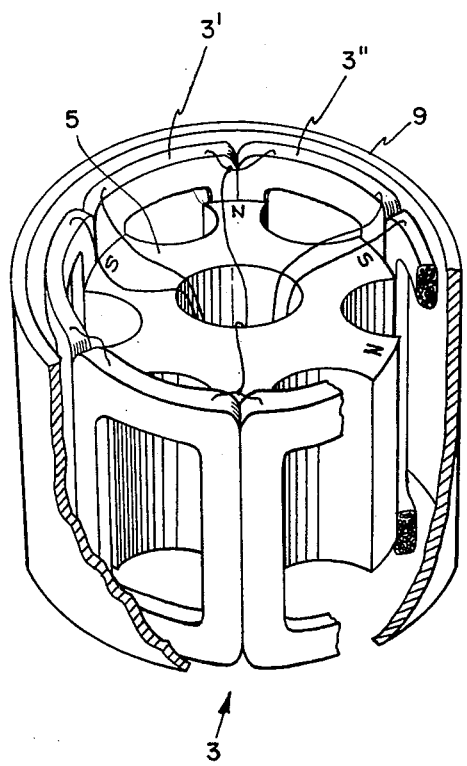

The invention will be more fully understood by the following description of a specific embodiment thereof taken with the drawings in which:

FIG. 1 is an elevational view partially in section of an embodiment of the present invention;
FIG. 2 is a sectional view taken along the line 2—2 of FIG. 1;
FIG. 3 is a prospective view; and
FIG. 4 is a schematic of the coils showing the electrical connections thereof.

In the drawings, numeral 1 designates the precession axis of a control gyro (not shown) and numeral 2 is a flange shaped coil body support which is mounted on the precession axis 1. A cylindrical coil body 3 is arranged co-axially with respect to the precession axis 1 and attached to the coil body support 2. The generated surface of the coil body 3 is formed by adjacent frame-type single coils 3', 3" which are connected with each other at their abutting ends 4 by any suitable means such as a synthetic-resin adhesive.

A star shaped magnetic core 5 is arranged inside the cylindrical coil body 3. The magnetic core 5 has alternatingly arranged north and south magnetic poles (N, S). The single coils 3', 3" are so sized that they extend from the center of a south magnetic pole to the center of the neighboring north magnetic pole.

The magnetic core 5 is fixed at a flange shaped magnet carrier 7 by means of clamping rods 6, the magnet carrier 7 being connected with a sleeve 8 penetrating the magnetic core in an axial direction. A magnetic shunt 9 between the gyro housing 10 and the magnetic carrier 7, is arranged to encircle the magnetic core 5. Thus, the coil body 3 moves together with the precession axis 1 in the air gap 11 between the magnetic core 5 and the magnetic shunt 9.

With any rotating movement of the precession axis, a voltage is induced in the single coils 3', 3" the quantity of which is proportional to the speed of revolution and the direction of which depends on the direction of revolution. Alternatively, it is possible to exert a moment of rotation on the precession axis 1 if a control voltage is fed into the single coils 3', 3". Thus, it is possible that the induced voltage can be obtained as a control voltage from a portion of the single coils and at the same a control voltage can be fed into the rest of the single coils in order to generate an angular momentum.

The wire ends of the single coils 3', 3" are led into terminals 12 of the coil body support 2 rotating together with the single coils. Lead-in wires 13 are passed axially through the sleeve 8 to terminals 12. The sleeve 8 is provided at its outer end with an insulating part 15 provided with a perforated rim 14. The individual lead-in wires 13 are passed through the holes of the perforated rim 14 and connected at the outside to connecting pieces 16 of the insulating part 15. Part 15 is connected with the magnet carrier 7 and consequently is stationary.

The lead-in wires, which are fixed at the outside to the stationary insulating part 15 and at the inside to the rotatable coil body support 2 will readily permit a rotation of the precession axis about such angular amounts as will be encountered.

I claim:
1. Gyroscope control apparatus which comprises a stationary magnetic core having a plurality of alternating north and south magnetic poles; non-polarized magnetic shunt means forming a complete cylinder surrounding said core and enclosing an airgap therebetween; a cylindrical coil body mounted for limited rotational movement in said airgap, said cylindrical coil body comprising a plurality of adjacent abutting individual coils, each of said coils forming a portion of the said cylindrical coil body and extending from one end of the said cylindrical coil body to the other; and means for rotating said cylindrical coil body within said airgap in accordance with precession movement of a gyroscope.

2. The apparatus of claim 1 wherein each of said individual coils covers an arc equal to that between adjacent magnetic poles.

3. The apparatus of claim 1 wherein lead wires from the individual coils extend axially through a channel defined by said stationary magnetic core.

4. The apparatus of claim 1 wherein a first portion of the individual coils are constructed to generate a voltage proportional to their speed of rotation and a second portion are constructed to receive a control voltage therein.

References Cited in the file of this patent

UNITED STATES PATENTS

| | | |
|---|---|---|
| 288,818 | Kimball | Nov. 20, 1883 |
| 2,225,014 | Lauck et al. | Dec. 17, 1940 |
| 2,315,216 | Moller et al. | Mar. 30, 1943 |
| 2,595,268 | Kellogg | May 6, 1952 |
| 2,849,630 | Waloff et al. | Aug. 26, 1958 |